United States Patent [19]

Hungtington

[11] 3,810,537

[45] May 14, 1974

[54] NOVEL BELT FEEDER

[75] Inventor: Fred R. Hungtington, Salt Lake City, Utah

[73] Assignee: The Galigher Company, Salt Lake City, Utah

[22] Filed: Apr. 13, 1972

[21] Appl. No.: 243,764

[52] U.S. Cl. .............................................. 198/57
[51] Int. Cl. .............................................. B65g 47/18
[58] Field of Search ............................... 198/52–58

[56] References Cited
UNITED STATES PATENTS

| 1,234,532 | 6/1917 | Dickerson | 198/58 |
| 2,007,874 | 6/1935 | Redler | 198/56 |
| 2,758,700 | 8/1956 | Plumb | 198/57 |
| 2,833,392 | 5/1958 | Meissner | 198/62 |
| 3,468,408 | 9/1969 | Hammond | 198/110 |
| 3,399,466 | 9/1968 | Hartley | 198/57 |
| 3,679,044 | 7/1972 | McGinnis | 198/201 |
| 2,900,069 | 8/1959 | Manns | 198/204 |
| 3,061,073 | 10/1962 | Wickam | 198/52 |

Primary Examiner—Richard E. Aegerter

[57] ABSTRACT

A novel belt feeder for metering particulate materials is disclosed. The feed belt, enclosed in a dust-free enclosure, has flanged edges. The particulate material flows onto the belt through an opening which is elongated and has an increasing width in the direction of the belt travel to prevent bridging of the particulate material. An adjustable gate is disposed next to the downstream end of the feed opening to regulate the burden depth of material on the belt. A flexible skirt partially encircling the feed opening, substantially sealing the vertical space between the feed opening and the belt.

2 Claims, 6 Drawing Figures

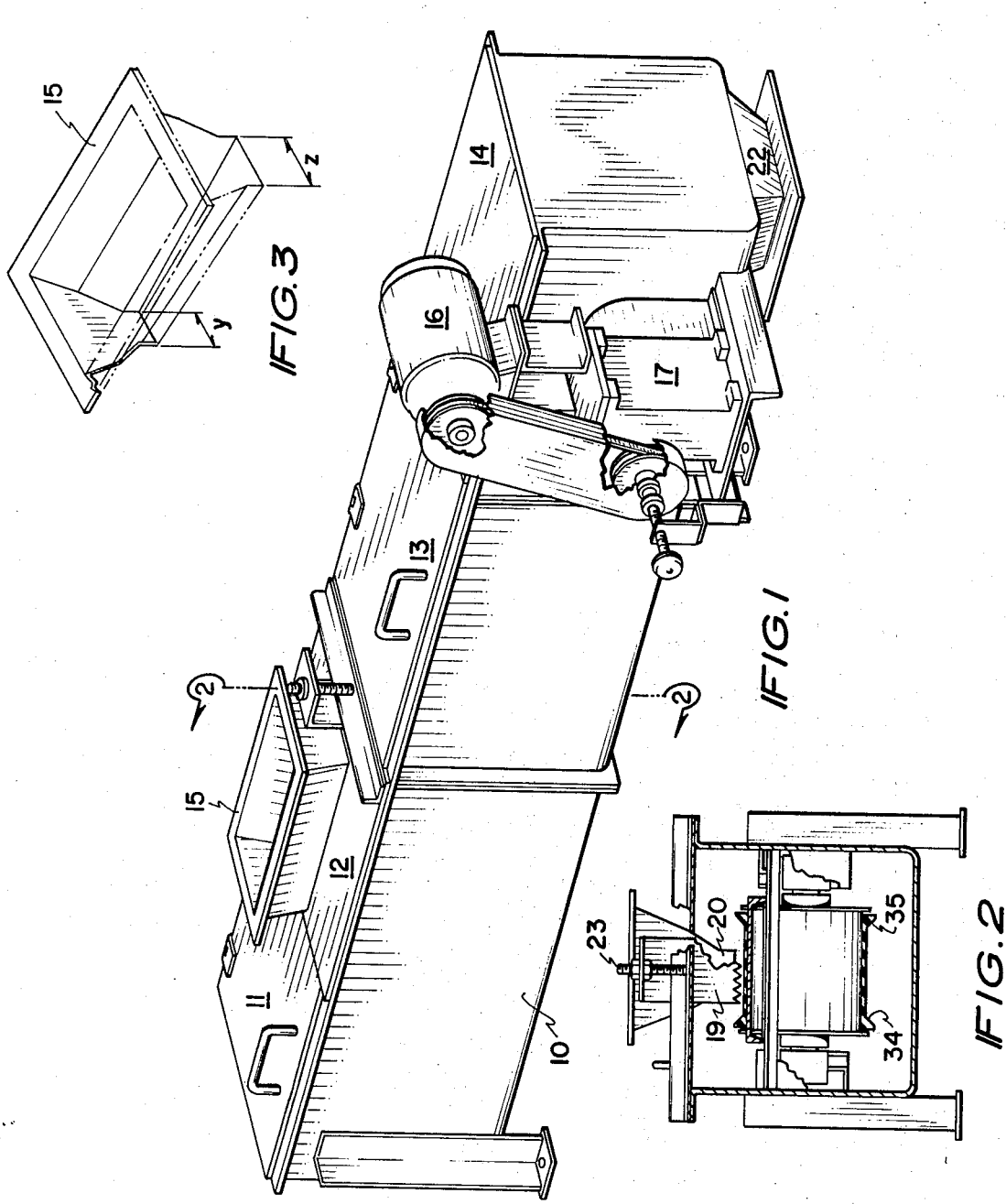

NOVEL BELT FEEDER

DESCRIPTION OF INVENTION

A belt feeder has now been invented which feeds particulate at a predetermined rate. A portion of particulate material is removed from a process stream and directed to the belt feeder. The belt feeder meters the amount of material fed to a sampling system. The belt feeder comprises an endless belt, preferably of flexible resilient material such as rubber, which has flanged edges to form an elongated trough. Particulate material flows vertically through an inlet hopper onto the belt. The belt is preferably disposed horizontally so that the belt is level. The inlet hopper extends downwardly near the upper surface of the belt. A flexible skirt partially encircles the bottom of the inlet hopper to create a seal between the hopper and the belt.

Further explanation of the invention may be facilitated by reference to the accompanying drawings.

FIG. 1 is a perspective view of a belt feeder.

FIG. 2 is an elevational sectional view along section lines 2—2 of FIG. 1.

FIG. 3 is a perspective view of the inlet hopper.

Figure 4:
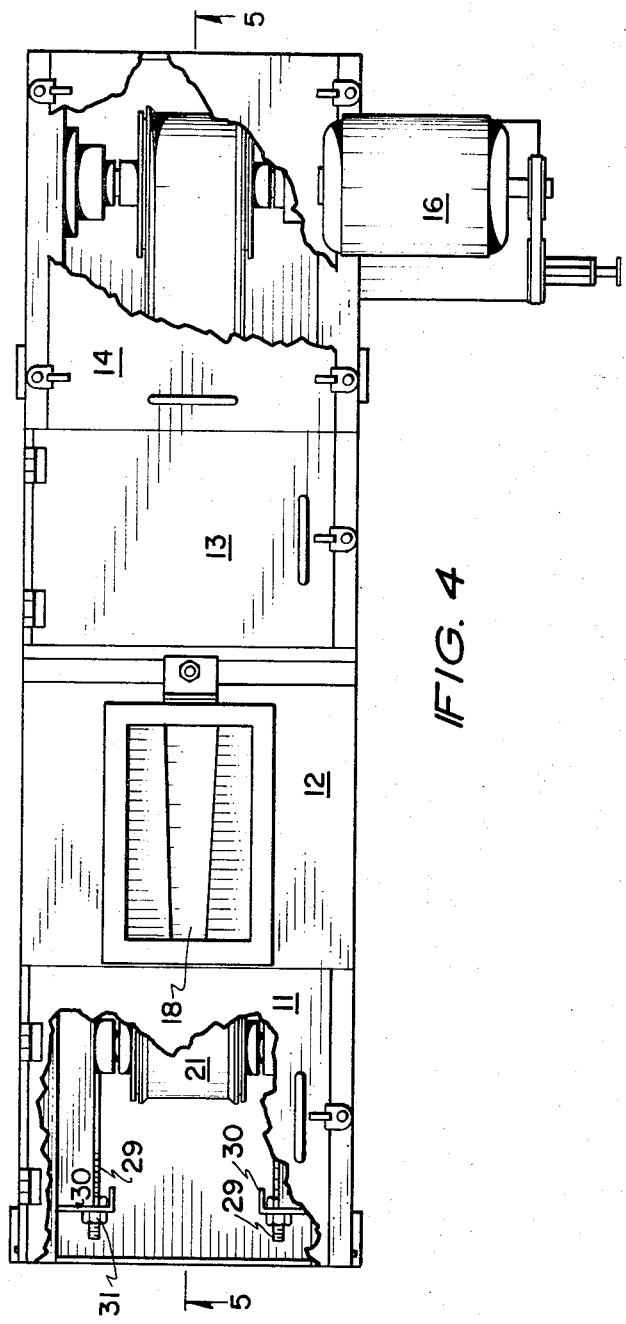
FIG. 4 is a plan view of the belt feeder fragmented to expose internal features.
Figure 6:
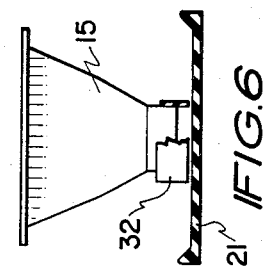
FIG. 6 is an elevational view illustrating the inlet hopper and skirt.
Figure 5:
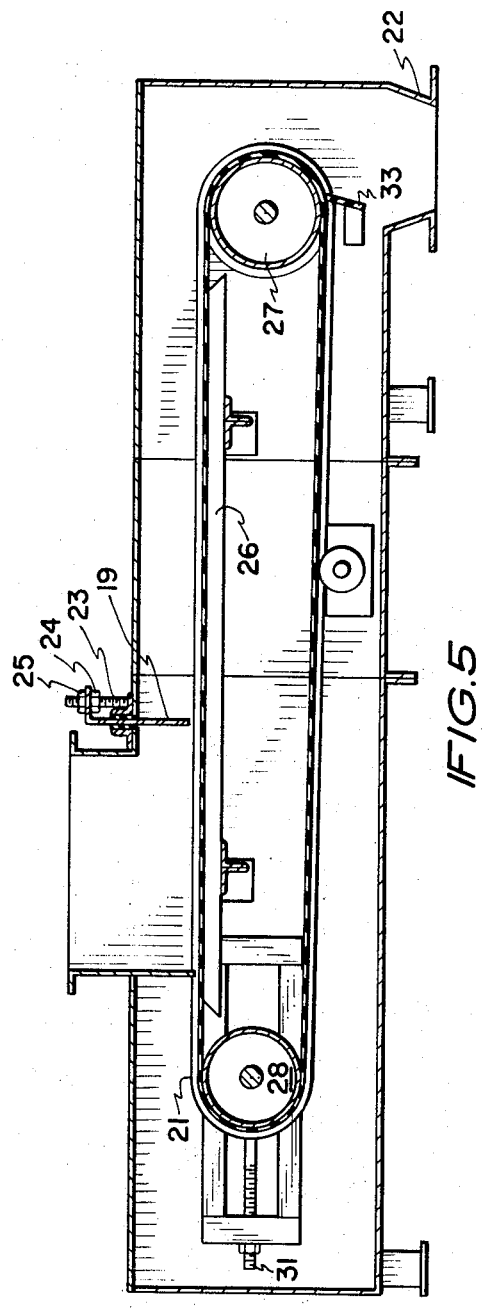
FIG. 5 is an elevational sectional view along section lines 5—5 of FIG. 4.

An overall external view of the integral, enclosed feeder is shown in FIG. 1. A dust-free enclosure 10 forms the outer shell of the feeder. The upper portion of the enclosure comprises several panels 11, 13 and 14 which, as illustrated, are preferably removable, and a panel 12 through which hopper 15 protrudes, which panel 12 is generally fixed to the shell. The removable panels 11, 13 and 14 permit ready access to the interior of the shell. Panel 13 is hinged to allow easy access, while the other panels are bolted to the enclosure.

The drive motor 16 and gear reduction mechanism 17 are located externally to the enclosure. The motor and gear reduction mechanism are sized to accommodate the load. Maintenance and explosion hazards are reduced by having the motor and gear reduction mechanism not located in dusty environments, which can exist inside the feeder.

Particulate material is introduced to the belt feeder through inlet hopper 15 which has a substantially rectangular shape with the length being substantially along the belt's length; see FIGS. 1, 3 and 4. The lower opening 18 of the hopper is located in close proximity to the belt. The opening 18 is preferably contained in a horizontal plane with the lower edges of the hopper all substantially equidistant to the upper belt surface. The opening 18 is substantially longer than it is wide and diverges in width in the direction of belt travel. In FIG. 3, opening width Z is substantially greater than width Y. The greatest width Z of opening 18 is preferably substantially less than the width of belt 21. A commerically desirable width of which Z is about one-half the belt width. The longitudinal side walls of the hopper slope from the upper opening towards the center to form lower opening 18.

At the wider end of opening 18 a gate 19 is located adjacent to end wall 20; see FIG. 2. End wall 20 may be shorter than the other side walls of hopper 15 to enhance the control function of gate 19. The gate 19 controls the burden depth of particulate material on belt 21. The burden depth and belt speed determine the flow rate, i.e. volume or weight per unit of time, of material discharged from the belt through discharge chute 22. Since the motor speed is generally fixed, belt speed can be controlled by a variable speed reduction means; for example, a variable ratio sheave system or a variable ratio gear reducer. The burden depth is more simply regulated by adjustable gate 19 which protrudes vertically through a slot-like opening in plate 12 and is supported by an adjustable support. The adjustable support shown in the illustrations is a threaded member, e.g., a bolt 23. A pair of nuts 24 and 25 provide the adjustment means.

Belt 21 is an endless flanged belt, i.e. flanged edges or ridges 34 and 35, see FIG. 2, run the entire periphery of the belt. The belt is preferably a resilient belt such as a rubber belt, e.g. natural rubber, urethane rubber, and other synthetic resinous materials, such as vinyl materials and the like.

The belt 21 is supported by an elongated, smooth, flat-surfaced plate 26. A flat-surfaced support is preferred since it keeps the upper portion of the belt flatter, making it easier to effect an efficient seal between the bottom of hopper 15 and the belt 21. Thus, even though the belt may not be properly tensioned, the upper portion of the belt will be maintained smooth and flat as it slides over support plate 26. It is further preferred that belt 21 be flat and smooth as it passes under gate 19 inasmuch as a uniform burden depth is required for any particular setting of gate 19 since this belt feeder is to perform a metering function.

The upper portion of belt 21 may be supported by rollers; however, the rollers must be closely spaced so that the upper surface of the belt is maintained smooth and flat. Small diameter rollers are preferred for this purpose; for example, rollers having a diameter less than about 2 inches. The rollers are preferably spaced on center at about 1.5 to 2 diameters. It is important that proper belt tension is maintained when roller supports are used. Because of the large number of rollers required and tension requirements, a flat-plate is generally preferred as the means for supporting the upper portion of belt 21 in a smooth, flat condition, particularly in the region below hopper 15 and gate 19.

The drive pulley for driving belt 21 is located so that the upper portion of belt 21 is pulled across plate 26. As shown in the illustrations, the drive pulley 27 is located at the discharge end of belt 21. Drive pulley 27 is connected by shaft means to gear reduction means 17. It is preferred to drag or pull belt 21 across plate 26 to maintain the upper portion of the belt smooth and flat. If the drive pulley were located at the opposite end of the feeder, the upper portion of the belt would be pushed across plate 26, which could cause the upper portion of the belt to buckle slightly under heavy loads when the belt tension is insufficient to maintain the belt taunt.

Pulley 28 is a take-up pulley which maintains proper tension on belt 21 through lateral adjustment. Bolts 29 serve as means for horizontally adjusting the position of pulley 28, thereby adjusting tension on belt 21. Bolts 29 pass through openings in brackets 30 which are secured to the belt feeder frame. Nuts 31 threaded on bolts 29 are tightened to increase tension on belt 21.

A flexible skirt 32 of rubber, polyvinyl chloride, polyurethane and other flexible materials encircles the lower portion of the hopper forming opening 18. The skirt 32 effects a seal between the lower edges of the hopper 15 and belt 21. The skirt preferably makes slight contact with the belt. Since the skirt is a flexible material, very little wear or abrasion results from its contact with the belt.

In operation, the belt feeder receives particulate material through hopper 15. Generally, the particulate material falls vertically into hopper 15. The minimum width of opening 18 of hopper 15 is preferably at least four times the diameter of the largest particles being handled.

The particulate material, e.g., mineral particles such as ores, coal, clays and the like, entering hopper 15 is a sample stream separated from the main stream of material. The sampled material is tested for composition, e.g. sulfur content in coal; chemical value, e.g. thermal value of coal; moisture; particle size distribution; and similar physical and chemical properties. It is important, therefore, that the sample integrity be maintained, i.e. no sample material lost nor foreign material picked up. The skirt 32 and flanged belt aid in preventing loss of material. The dust-tight enclosure prevents external foreign material from reaching belt 21. Also, scraper 33 prevents material from adhering to the belt 21 and from being carried around to contaminate other materials, or cause a build-up of material.

Particulate material may enter hopper 15 continuously or only periodically. Gate 19 is set to regulate flow of material onto belt 21. Gate 19 may be set at a predetermined setting to provide a continuous flow of material onto belt 21, even though material enters hopper 15 only periodically.

Material discharges from the belt 21 as it turns over pulley 27. The material drops vertically through discharge chute 22 into a further portion of the sampling system, which is preferably enclosed.

Although a wide variety of flow rates can be handled by any given belt feeder of this invention by varying the height of opening between belt 21 and gate 19 and varying belt speed, the belt feeder can be constructed in various sizes. Typical sizes include belt feeders having belt widths of 6, 12 and 18 inches. The size of opening 18 varies with the width of belt utilized. Both the length and width of opening 18 are varied with belt width, e.g. both the length and maximum width Z are approximately doubled for the 12-inch belt feeder in comparison with the 6-inch belt feeder. The length of opening 18 is increased with belt size inasmuch as the angle of divergence of opening 18 remains approximately constant regardless of the dimensions.

The optimum burden depth generally depends upon the width of belt, for example, a 6-inch-wide belt is operated typically with a 1-to 2-inch depth of material. The minimum burden depth is generally a function of particle size, i.e. gate 19 is adjusted to a minimum opening of about three times the particle diameter of material being handled to prevent bridging. A minimum burden depth of zero inches is, of course, attainable by closing gate 19.

The extent of gate adjustment varies with the width of belt utilized. The maximum gate opening is substantially equal to one-half the belt width; thus, an 18-inch-wide belt has a maximum gate opening and maximum burden depth of about 9 inches. A typical burden depth for various belt sizes is about one to 2 inches for a belt 6 inches wide; about 2 and 2½ inches for a belt 12 inches wide; and about 3 inches for a belt 18 inches wide.

The flanged belts have flanges of various depths depending upon belt widths. For example, a typical 6-inch-wide belt has a flange depth of about three-fourths of an inch, while 12 and 18-inch-wide belts have flange depths of about 1½ inches. Flange depths may, of course, vary with respect to a given belt width, although flange depths greater than about 2 inches are generally not utilized. The flanged edges are intended primarily to prevent material from rolling off the belt edges.

The belt speed, as indicated above, may be variable or fixed. Belt speeds of about 1 to about 50 feet per minute are utilized with typical speeds being about 3 to about 10 feet per minute. Belt feeders having fixed speeds usually have a fixed speed within the 3 to 10 feet per minute range, while variable speed belt feeders may have operating ranges from about one to about 50 feet per minute. The volume or weight of material handled per hour is readily varied by varying the speed of a variable speed belt feeder. For example, a minimum flow rate may not be attainable by setting the gate at its minimum setting because of a large particle size and, consequently, great burden depth, in which instance the ability of the machine to achieve a slower speed is essential. Also, because each belt width has a certain maximum burden depth, an increase in belt speed is necessary to achieve certain maximum flow rates.

Typical motor sizes for the belt feeders of this invention are from about one-fourth to two horsepower, depending upon belt width. A one-fourth horsepower motor is generally utilized for belts having a width of 6 inches or less, while belts between 6 and 12 inches wide are usually provided with one horsepower motors. Belts having widths between 12 and 18 inches are preferably driven with two horsepower motors.

The belt 21 is substantially the same regardless of width or length, although a smooth, non-absorptive, neoprene, food-grade belt is preferred, especially for the smaller widths.

The belt feeder of this invention is especially designed to meter particulate material directed towards a sampling station. The belt feeder is usually oriented so that the flat, upper surface of the belt is in a horizontal position although the belt may be inclined slightly, i.e. at angles of inclination or declination of up to about 10°. The belt feeder is equipped with a non-bridging hopper so that the flow of sample material is not accidentally interrupted, which could cause erroneous sample data. The belt feeder is versatile in handling particles of various sizes and various flow rates.

Although the invention has been described hereinabove by reference to specific embodiments, it is to be understood that it is not intended to be limited thereof, but to include all the variations and modifications falling within the scope of the appended claims.

I claim:

1. A belt feeder for metering samples of particulate material comprising:
   a. an endless belt having a length substantially greater than its width and having flanged edges to form a traveling trough,
   b. a pair of end wheel members for supporting said belt, one of said wheels being a drive wheel to pull the upper portion of said belt over said flate plate member, c. a substantially rectangular, non-bridging feed hopper communicating with the upper surface of said belt, said feed hopper having sloping side walls and a lower opening increasing in width in the direction of belt travel, said lower opening having a maximum width no greater than one-half the width of said belt, d. skirt means sealing the space between said lower opening of the hopper and said belt, e. an elongated enclosure means for enclosing said endless belt, said enclosure having an upper opening for a feed hopper and a terminal discharge opening near one end of said enclosure, f. adjustable vertical gate means forming an end of said hopper to control burden depth of sample on said belt to a depth less than about one-half of said belt width, said adjustable gate having adjustment means external to said enclosure, g. variable speed drive means for rotating said drive wheel, said variable drive means being located externally of said elongated enclosure means, h. a flat support plate supporting the upper portion of said endless belt intermediate said end wheel members to maintain the upper portion of said belt flat and smooth beneath said hopper and adjustable gate.

2. The belt feeder of claim 1 wherein said endless belt is a food-grade neoprene belt.

* * * * *

UNITED STATES PATENT OFFICE
CERTIFICATE OF CORRECTION

Patent No. 3,810,537     Dated May 14, 1974

Inventor(s) Fred R. Huntington

It is certified that error appears in the above-identified patent and that said Letters Patent are hereby corrected as shown below:

Abstract page, below Item [19], change "Hungtington" to --Huntington--;

Abstract page, Item [75], change "Hungtington" to --Huntington--;

Col. 1, line 61, change "which" to --width--;

Col. 2, line 60, change "taunt" to --taut--;

Col. 5, line 1, change "flate" to --flat--.

Signed and sealed this 1st day of October 1974.

(SEAL)
Attest:

McCOY M. GIBSON JR.
Attesting Officer

C. MARSHALL DANN
Commissioner of Patents